United States Patent
Ilvonen et al.

(10) Patent No.: US 11,901,609 B2
(45) Date of Patent: Feb. 13, 2024

(54) ANTENNA EXTENDER, AND ELECTRONIC DEVICE WITH ANTENNA EXTENDER

(71) Applicant: HUAWEI TECHNOLOGIES CO., LTD., Shenzhen (CN)

(72) Inventors: Janne Ilvonen, Helsinki (FI); Ruiyuan Tian, Helsinki (FI); Li Dong, Dongguan (CN); Changnian Xu, Shenzhen (CN); Dong Liu, Dongguan (CN); Hongting Luo, Shanghai (CN); Dongxing Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 17/704,117

(22) Filed: Mar. 25, 2022

(65) Prior Publication Data
US 2022/0216593 A1    Jul. 7, 2022

Related U.S. Application Data

(63) Continuation of application No. 16/976,818, filed as application No. PCT/EP2018/057064 on Mar. 20, 2018, now Pat. No. 11,335,993.

(51) Int. Cl.
*H01Q 1/24* (2006.01)
*H04M 1/02* (2006.01)
(Continued)

(52) U.S. Cl.
CPC ............. *H01Q 1/24* (2013.01); *H04M 1/02* (2013.01); *H04M 1/0283* (2013.01); *H01Q 7/00* (2013.01);
(Continued)

(58) Field of Classification Search
CPC .. H01Q 1/24; H01Q 7/00; H01Q 9/26; H01Q 9/42; H01Q 13/10; H04M 1/0283; H04M 1/02
(Continued)

(56) References Cited

U.S. PATENT DOCUMENTS

| 9,203,456 B2 | 12/2015 | Teng et al. |
| 2013/0050031 A1 | 2/2013 | Zhu et al. |

(Continued)

FOREIGN PATENT DOCUMENTS

| CN | 202205524 U | 4/2012 |
| CN | 106207446 A | 12/2016 |

(Continued)

OTHER PUBLICATIONS

Kivekäs et al., Bandwidth, SAR, and Efficiency of Internal Mobile Phone Antennas, IEEE Transactions on Electromagnetic Compatibility, vol. 46, No. 1, Feb. 2004, pp. 71-86.
(Continued)

*Primary Examiner* — Hai V Tran
(74) *Attorney, Agent, or Firm* — Maier & Maier, PLLC

(57) ABSTRACT

An electronic device comprises a housing having a first side and a second side, a dielectric cover (602) on said second side, and an electrically conductive peripheral structure along edges of said first and second sides. An antenna feed (601) is coupled to a portion (603) of said peripheral structure for using said portion (603) as a radiating antenna element. A conductive member (604, 804) is located on or underneath said dielectric cover (602). The purpose of the conductive member is to enlarge the surface area where the electric field is distributed on to increase the antenna aperture for radiation.

17 Claims, 7 Drawing Sheets

(51) Int. Cl.
 *H01Q 7/00* (2006.01)
 *H01Q 9/26* (2006.01)
 *H01Q 9/42* (2006.01)
 *H01Q 13/10* (2006.01)

(52) U.S. Cl.
 CPC ............... *H01Q 9/26* (2013.01); *H01Q 9/42* (2013.01); *H01Q 13/10* (2013.01)

(58) Field of Classification Search
 USPC .................................................. 343/700 MS
 See application file for complete search history.

(56) References Cited

U.S. PATENT DOCUMENTS

| | | | |
|---|---|---|---|
| 2013/0076574 | A1 | 3/2013 | Rappoport et al. |
| 2014/0078008 | A1 | 3/2014 | Kang et al. |
| 2014/0266941 | A1 | 9/2014 | Vazquez et al. |
| 2015/0263414 | A1 | 9/2015 | Chun et al. |
| 2015/0372372 | A1 | 12/2015 | Lee et al. |
| 2016/0049720 | A1 | 2/2016 | Hwang et al. |
| 2016/0164168 | A1 | 6/2016 | Choi et al. |
| 2016/0309007 | A1 | 10/2016 | Irci et al. |
| 2017/0047639 | A1 | 2/2017 | Lee et al. |
| 2017/0207516 | A1 | 7/2017 | Koo et al. |
| 2017/0244153 | A1 | 8/2017 | Chen et al. |
| 2017/0302771 | A1 | 10/2017 | Kim et al. |

FOREIGN PATENT DOCUMENTS

| | | |
|---|---|---|
| CN | 107204509 A | 9/2017 |
| EP | 3 029 767 A2 | 6/2016 |
| JP | 2002223114 A | 8/2002 |
| JP | 2013150067 A | 8/2013 |
| JP | 2016111669 A | 6/2016 |
| JP | 2017092809 A | 5/2017 |
| WO | 2007094494 A1 | 8/2007 |

OTHER PUBLICATIONS

Ilvonen, "Multiband and environment insensitive handset antennas", Aalto University, Department of Radio Science and Engineering, Dec. 2014, 99 pages.

Heberling et al., "Trends on Handset Antennas", 29th European Microwave Conference, Munich, Germany, 1999, pp. 131-134.

Rowell et al., "Mobile-Phone Antenna Design, IEEE Antennas and Propagation Magazine", vol. 54, No. 4, Aug. 2012, pp. 14-34.

Holopainen, "Compact UHF-band antennas for mobile terminals: focus on modelling, implementation, and user interaction", Aalto University, Department of Radio Science and Engineering, Espoo, Finland, Apr. 2011, 84 pages.

Ilvonen et al., "Design Strategy for 4G Handset Antennas and a Multiband Hybrid Antenna", IEEE Transactions on Antennas and Propagation, vol. 62, No. 4,, Apr. 2014, pp. 1918-1927.

ANTENNA EXTENDER, AND ELECTRONIC DEVICE WITH ANTENNA EXTENDER

CROSS-REFERENCE TO RELATED APPLICATIONS

This application is a continuation of U.S. patent application Ser. No. 16/976,818, filed on Aug. 31, 2020, which is a National Stage of International Application No. PCT/EP2018/057064, filed on Mar. 20, 2018, which are hereby incorporated by reference in their entirety.

TECHNICAL FIELD

The embodiments relate to the field of antennas used for wireless communications, and particularly to antennas that fit into tight spaces in electronic devices built with electrically conductive frames. Furthermore the embodiments relate to antenna arrangements that include a plurality of antennas, and to electronic devices that include an antenna or antenna arrangement.

BACKGROUND

Antennas are needed in all electronic devices that communicate using radio waves. Many such devices are meant to be portable, easily usable, and aesthetically appealing to users. As a consequence their size, design, overall appearance, mechanical robustness, and efficiency in radio communications may pose difficult and possibly mutually contradicting requirements to antenna design.

One example of such an electronic device is a portable communications and/or computing device such as a smartphone, a tablet computer, or a laptop computer. Such a device may be relatively flat and somewhat elongated in form, and have two ends, two side edges, as well as a front side and a back side. A large majority portion of the front side is often reserved for a touch-sensitive display. The back side may be covered by a back cover made of plastic, but in many cases the back side includes a layer of glass and/or metal. The circumference along the ends and side edges may also include a metallic frame. The device may be only a few millimeters thick, and the ends and side edges may measure from a few centimeters to a few decimeters. The physical dimensions of an antenna have certain relation to the wavelength of communications, which means that if an antenna is to be used for communications at wavelengths below 6 GHz, it must have physical dimensions in the order of some centimeters. It is difficult to design an antenna of that size so that, on one hand, it would enable efficient communications and high data throughput but on the other hand it would fit easily within a portable communications device.

Prior art suggests various antenna structures that may make use of the metallic or otherwise conductive structural parts of the electronic device. However, it has been found that antenna performance is not always optimal over the whole required frequency range and/or all frequency bands on which the electronic device should operate.

SUMMARY

An object of the embodiments is to provide an antenna that is compact in size, applicable in portable electronic devices, robust against many kinds of operating conditions, and combinable with other antennas included in an electronic device. Another object is that the antenna could be implemented in a confined space among other parts and structures of an electronic device, and yet have good performance Yet another object is to provide an electronic device that includes at least one antenna of its kind.

According to a first aspect, an electronic device is provided. The electronic device includes a housing having a first side and a second side, a dielectric cover on the second side, and an electrically conductive peripheral structure along edges of the first and second sides. The electronic device also includes an antenna feed coupled to a portion of the peripheral structure for using the portion as a radiating antenna element. Additionally the electronic device includes a conductive member on (e.g. attached on an inner side or an outer side of) the dielectric cover. Alternatively, the conductive member may be arranged underneath the dielectric cover (e.g. on a further support structure inside the housing). The conductive member has a first dimension along a longitudinal direction of the portion and extending inwards from the portion—with reference to the peripheral structure—by a second dimension, the second dimension being less than twice the first dimension. The electronic device includes an electric coupling between the portion and that part of the conductive member that extends along the longitudinal direction of the portion. The conductive member forms an antenna extender and, hence, can also be called an antenna extender. A purpose of the conductive member, i.e. the antenna extender, is to enlarge the surface area where the electric field is distributed on. In other words, the antenna extender increases the antenna aperture for radiation. It will improve the chassis mode excitation at desired frequency band(s). The antenna extender can be used, for example, to improve radiation efficiency, adjust resonant frequency, increase impedance bandwidth, and modify current distributions and radiation patterns to control, e.g. the effect of the user.

The antenna extender allows making an antenna of compact in size, for example in portable electronic devices in which there is little space, because it improves the impedance bandwidth and efficiency of the antenna without requiring more antenna clearance (i.e. more distance between radiating antenna element and ground). The improvement in impedance bandwidth and efficiency also increase robustness against suboptimal operating conditions, because they provide more marginal before the performance of the antenna would fall below acceptable limits. The antenna extender does not occupy such space that would otherwise be needed for other antennas in the same device, which makes the solution very compatible with other antennas. The antenna may even share some structures with other parts of the electronic device, which further emphasizes its suitability for confined spaces.

In a first implementation form of the electronic device, the dielectric cover is a dielectric plate and the conductive member is mechanically supported by the dielectric plate. This involves an advantage that the mechanical structure can be made robust and relatively easy to manufacture. It also involves the advantage that the distance between the conductive member and a grounded part of the electric device, such as a display, can be made as large as possible. This improves the impedance bandwidth and efficiency.

In a further implementation form of the electronic device, the dielectric plate is made of plastic, glass, ceramic, wood, or another dielectric substance, as desired, and has an inner surface and an outer surface, and the conductive member is a piece of conductive material fixedly attached to the inner surface of the dielectric plate. This involves advantages that the outer appearance of the device can be made very appealing, and that the mechanical structure can be made robust and relatively easy to manufacture.

In a further implementation form of the electronic device, the dielectric plate is transparent or translucent and includes a decorative layer on the inner surface, and the conductive member is indirectly attached to the inner surface of the dielectric plate through being attached to the decorative layer. This involves an advantage that the advantageous outer appearance of the device does not need to be compromised even if a conductive member of this kind is used as an antenna extender.

In a further implementation form of the electronic device, the electronic device includes a dielectric support structure inside the dielectric cover, and the conductive member is mechanically supported by the dielectric support structure. This involves an advantage that the design and mechanical structure of the antenna extender can be particularly well tailored according to operating frequencies and other affecting factors, and/or that some dielectric part inside the electronic device can efficiently double as a support structure for the antenna extender.

In a further implementation form of the electronic device, the electric coupling is a galvanic coupling including at least one of: a direct contact between the portion and the conductive member; a coupling through a conductive gasket between the portion and the conductive member; a coupling through two or more discrete contact members between the portion and the conductive member; a weld-, solder-, or glue joint between the portion and the conductive member. This involves an advantage that a secure electric coupling can be made in a wide variety of alternatives concerning the parts and materials in the surrounding structure.

In a further implementation form of the electronic device, the electric coupling is a non-galvanic coupling including at least one of a capacitive coupling and an inductive coupling. This involves an advantage that no direct contact needs to be made between certain parts, which makes it easier to design and assemble the structure and helps to avoid any problems that suboptimal contacts could cause.

In a further implementation form of the electronic device, a crossover frequency of the non-galvanic coupling is in the order of tens to hundreds of megahertz. This involves an advantage that sufficient electromagnetic connection can be made at frequencies that are useful taken the other dimensions of the antenna structure.

In a further implementation form of the electronic device, the portion includes a radiating antenna element of an antenna structure that is one of the following: a monopole antenna, a dipole antenna, a folded dipole antenna, a capacitive coupling element antenna, an inverted-F antenna, a loop antenna, and a slot antenna. This involves an advantage that the most suitable antenna type can be selected for a particular implementation.

DETAILED DESCRIPTION

An electronic device may include an inner part enclosed in an outer cover. Typically the inner part or chassis includes the electronic components needed for the operation of the electronic device, while the role of the outer cover is to provide mechanical support and protection as well as an appealing outer appearance. If the electronic device is equipped for wireless communications, it must have one or more antennas built into it. The provision of an electrically conductive peripheral structure, such as the so-called ring or outer frame that forms a part of the structure and outer appearance of many sophisticated smartphones, allows using one or more sections of the electrically conductive peripheral structure as radiating antenna elements. According to established vocabulary, a radiating antenna element is a structural part to which an oscillating electric current of high frequency is coupled for transmitting a radio signal, and/or to which a received radio signal induces an oscillating electric current of high frequency that can in turn be converted into the received signal.

Figure 1:
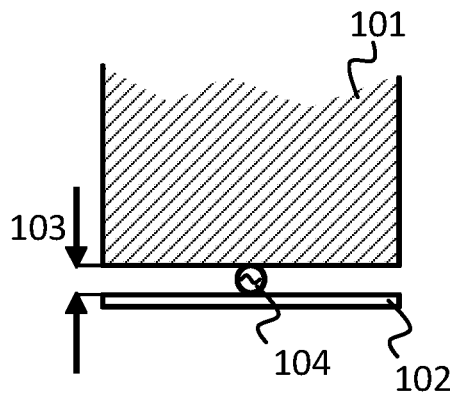
FIG. 1 illustrates a CCE antenna.
Figure 2:
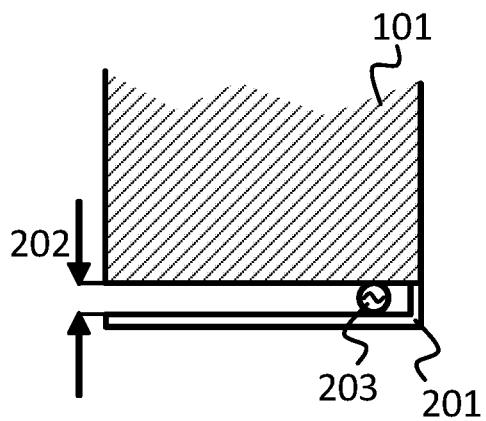
FIG. 2 illustrates an inverted-F antenna.
Figure 3:
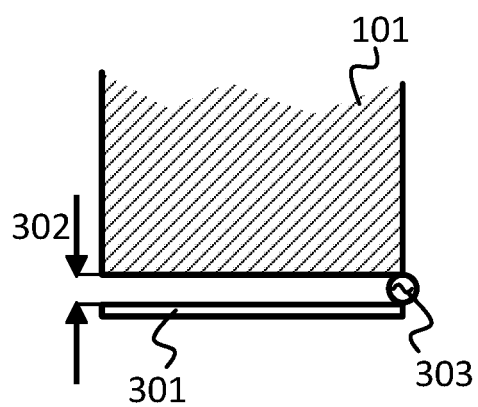
FIG. 3 illustrates a monopole or inverted-L antenna.

FIGS. 1, 2, and 3 illustrate electronic devices that include an inner part, or chassis, 101 and a radiating antenna element, which may be a portion of an electrically conductive peripheral structure. It is typical to the inner part or chassis 101 that it includes a relatively extensive ground plane, for which reason it may be considered as a grounded region that has an effect on the performance of the radiating antenna element.

In FIG. 1 the radiating antenna element 102 is a straight portion of the electrically conductive peripheral structure, the whole length of which is located at a distance 103 from a straight edge of the inner part or chassis 101. An antenna feed 104 is at or close to a middle point of the radiating antenna element 102. Neither of these (antenna element being straight; antenna feed being close to the middle) is a strict requirement, and variations are possible. The antenna of FIG. 1 could be called a CCE (Capacitive Coupling Element) antenna.

In FIG. 2 the radiating antenna element 201 is otherwise located at a distance 202 from a straight edge of the inner part or chassis 101, but at one end of the radiating antenna element 201 there is a direct contact to the (ground plane of the) inner part or chassis 101. A ground contact of this kind could be located anywhere along the length of the antenna element 201. In FIG. 2 an antenna feed 203 is closer to that end of the radiating antenna element 102 that has the contact than to its free end. Again, variations to all these features are possible. The antenna of FIG. 2 is an IFA (Inverted-F Antenna).

In FIG. 3 the radiating antenna element 301 is located at a distance 302 from a straight edge of the inner part or chassis 101. An antenna feed 303 is located at one end of the radiating antenna element 301, which makes the antenna a monopole or an ILA (inverted-L antenna).

Figure 4:
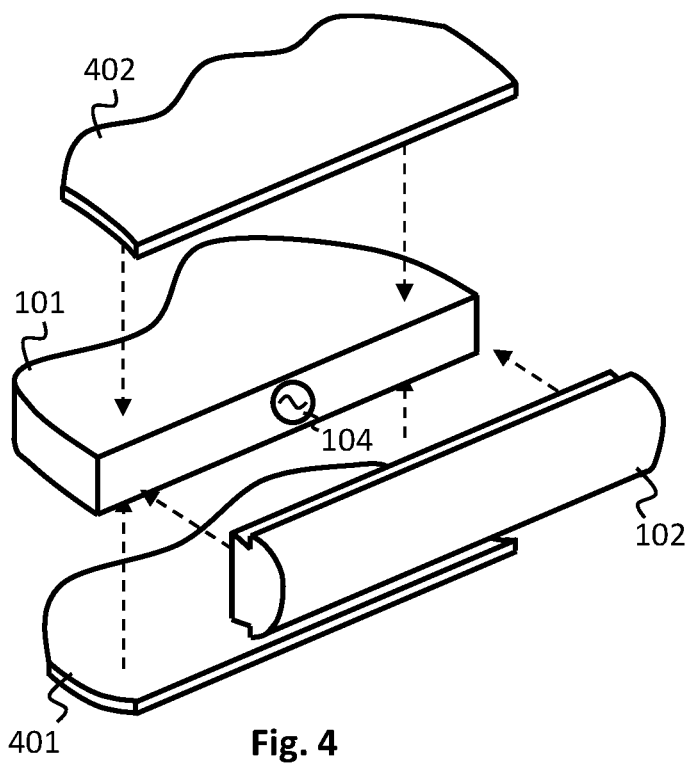
FIG. 4 illustrates certain structural parts of an electronic device.
Figure 5:
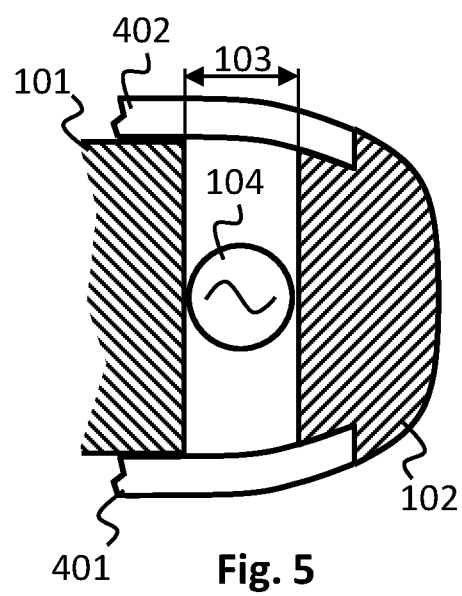
FIG. 5 illustrates a cross section of the structure of FIG. 4.

FIGS. 4 and 5 are further illustrations of a structure that may follow the principle of FIG. 1 above. The radiating antenna element 102 is a portion of an electrically conductive peripheral structure of the electronic device. The inner part or chassis 101 is illustrated in a simplified manner as a thick slab, a portion of which is shown in FIGS. 4 and 5. A first dielectric cover 401 covers a first (front) side of the electronic device, and a second dielectric cover 402 covers a second (back) side of the electronic device. In the assembled configuration the slightly inwards curved outer edges of the first 401 and second 402 dielectric covers come against respective grooves in the radiating antenna element 102, so that a streamlined outer appearance of the electronic device is achieved.

The distance 103, 202, or 302 at which the radiating antenna element is located from an adjacent grounded structure can be called the ground clearance or antenna clearance. The optimal magnitude of a ground clearance depends on the operating frequency and bandwidth. As a general rule on the operating frequencies smaller than 6 GHz that are common in smartphones and other widely used wireless communications devices a ground clearance of 5 to 10 millimeters could be close to an optimum. However, it may be desirable to cover a whole side surface, for example a front surface, of an electronic device with a (touch-sensitive) display. A display needs an associated ground plane, and this ground plane may define the effective outer dimensions of what is considered as the inner part or chassis 101 in FIGS. 1 to 3. As a consequence there may be as little as 1 to 2 millimeters, or even less, available as the ground clearance.

Figure 6:
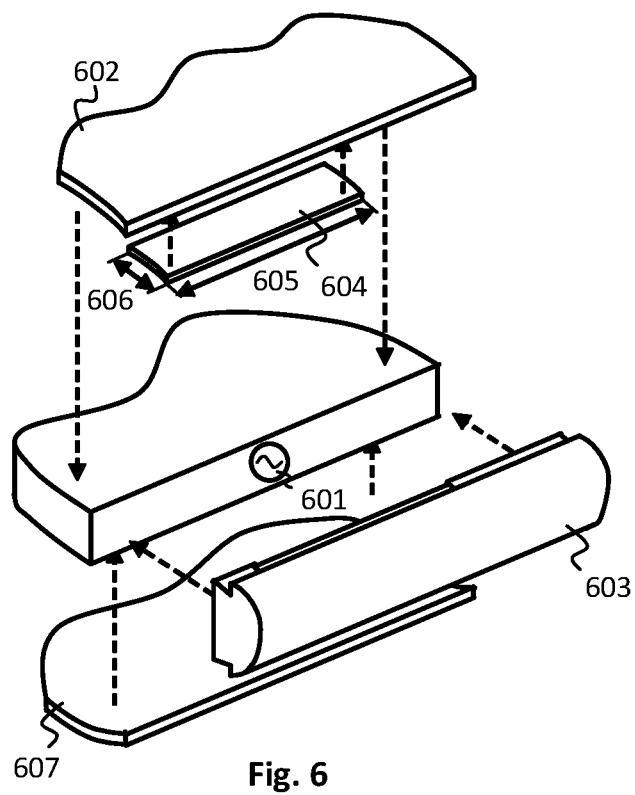
FIG. 6 illustrates some structural parts of an electronic device with an antenna extender.
Figure 7:
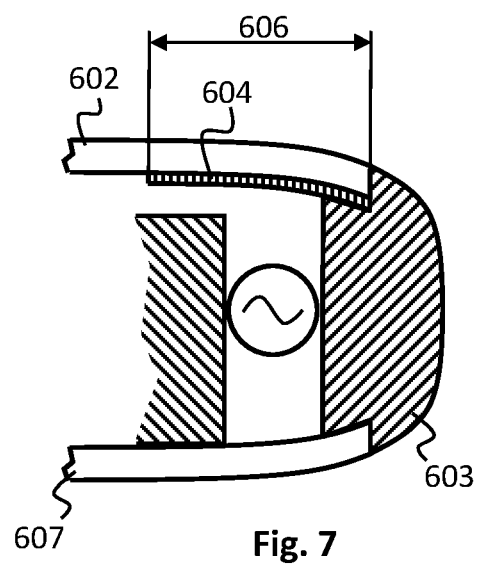
FIG. 7 illustrates a cross section of the structure of FIG. 6.

FIG. 6 illustrates some parts of an electronic device according to an embodiment in an exploded view. FIG. 7 is a cross section of these parts along a plane that goes through the antenna feed 601. The electronic device includes a housing having a first side and a second side. The first side is the lower side in FIGS. 6 and 7, and the second side is the upper side. The electronic device includes a dielectric cover 602 on the second side, and an electrically conductive peripheral structure along edges of the first and second sides. A portion 603 of the electrically conductive peripheral structure is seen in FIGS. 6 and 7. The antenna feed 601 is coupled to the portion 603 of the electrically conductive peripheral structure for using the portion 603 as a radiating antenna element.

As a difference to FIGS. 4 and 5, the electronic device of FIGS. 6 and 7 includes a conductive member 604 covered by and arranged on the dielectric cover 602. In this example the conductive member 604 is arranged on the inside (the inner surface) of the dielectric cover 602. However, in a further embodiment, the conductive member 604 may be arranged on the outside (the outer surface) of the dielectric cover 602. The conductive member 604 has a first dimension 605 along a longitudinal direction of the portion 603 of the electrically conductive peripheral structure that is used as a radiating antenna element. The conductive member 604 extends inwards from the portion 603 by a second dimension 606. Here "inwards" is defined as inwards with reference to the peripheral structure of the electronic device; in other words, "inwards" means towards the center of the electronic device.

Of the dimensions of the conductive member 604, the second dimension 606 is less than twice the first dimension 605. The significance of these dimensions is discussed in more detail later. The conductive member 604 can be alternatively called an antenna extender. The expressions conductive member and antenna extender are used interchangeably.

An electric coupling exists between the portion 603 of the electrically conductive peripheral structure that is used as a radiating antenna element and that part of the conductive member 604 that extends along the longitudinal direction of the portion. In the structure of FIGS. 6 and 7, one long edge of the conductive member 604 is in direct mechanical contact with a part of the portion 603, which ensures the electric coupling. Other ways of making such an electric coupling are discussed in more detail later.

In the structure of FIGS. 6 and 7, the dielectric cover 602 is a dielectric plate, and the conductive member 604 is mechanically supported by the dielectric plate. For example, the dielectric plate that includes the dielectric cover 602 can be made of, for example, plastic or glass, and it may have an inner surface and an outer surface. The conductive member 604 may be fixedly attached to the inner surface of the dielectric cover 602, for example by gluing or by ultrasonic welding. The conductive member 604 could also be attached in other ways, such as being embedded in the material of the dielectric cover 602. The actual way of attaching has little practical significance. Fixed attaching of this kind is based on an assumption that the conductive member 604 is a piece of conductive material, such as a piece of a metal foil or plate. An alternative would be to form the conductive member 604 on some surface of the dielectric cover 602 using conductive paint or other substance that is not in the form of a discrete, solid piece of conductive material before becoming attached to the dielectric cover 602.

Using the dielectric cover 602 as a mechanical support for the conductive member 604 involves an advantage that no other structural parts are needed for that purpose. It may also enable easy assembling of the electronic device, because the conductive member 604 may be attached to the inner surface of the dielectric cover 602 first, so that when at a later assembling stage the dielectric cover 602 and the electrically conductive peripheral structure are brought together, the electric coupling between the conductive member 604 and the portion 603 that is used as a radiating antenna element is automatically made. An electrically conductive gasket can be used to ensure the electric coupling, but this is not necessarily required. The use of plastic, glass, ceramic, wood, or other dielectric material as the material of the dielectric cover 602 may enable achieving a very appealing outer appearance of the electronic device at a reasonable level of manufacturing costs. Plastic as the material involves the additional advantage that ultrasonic welding, moulding, or other known method based on partly melting some of the plastic substance are available for fixedly attaching the conductive member 604 to the dielectric cover 602.

Figure 8:
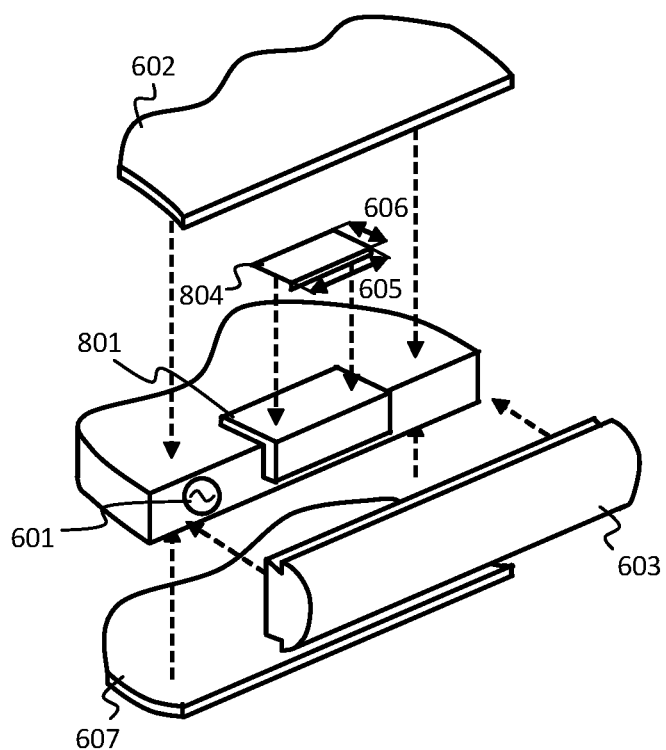
FIG. 8 illustrates some structural parts of an electronic device with an antenna extender.
Figure 9:
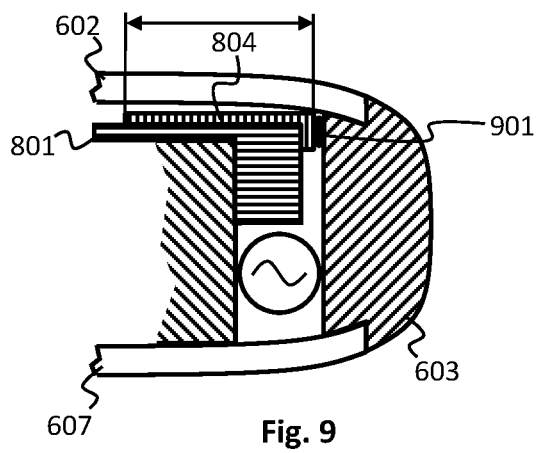
FIG. 9 illustrates a cross section of the structure of FIG. 8.

FIGS. 8 and 9 illustrate parts of an electronic device according to a further embodiment that includes a housing having a first side and a second side, and a dielectric cover 602 on the second side. The electronic device includes an electrically conductive peripheral structure along edges of the first and second sides, and an antenna feed 601 coupled to a portion 603 of the peripheral structure for using the portion 603 as a radiating antenna element.

The electronic device of FIGS. 8 and 9 includes a conductive member 804 covered by and arranged underneath the dielectric cover 602. For example, the electronic device includes a dielectric support structure 801 underneath the dielectric cover 602, and the conductive member 804 is mechanically supported by the dielectric support structure 801. Hence, the conductive member 804 is, in this embodiment, not arranged on the dielectric cover 602 but on the separate dielectric support structure 801 arranged underneath the dielectric cover 602. The dielectric support structure 801 may be part of (or may, in turn, be supported by) any other part of the electronic device, like a wall of a battery compartment, a conductive shielding can of high-frequency parts, a speaker box, or the like.

The conductive member 804 has a first dimension 605 along a longitudinal direction of the above-mentioned portion 603 of the peripheral structure of the electronic device. The conductive member 804 extends inwards from the portion 603 by a second dimension 606, so that again the "inwards" direction is taken with reference to the peripheral structure. The second dimension 606 is less than twice the first dimension 605. There is an electric coupling between the portion 603 of the peripheral structure and that part of the conductive member 804 that extends along the longitudinal direction of the portion.

In the embodiment of FIGS. 8 and 9 the electric coupling includes an elastic, electrically conductive gasket 901 located between the portion 603 of the peripheral structure and that part of the conductive member 804 that extends along the longitudinal direction of the portion. An electrically conductive gasket of this kind could be used also in the embodiment of FIGS. 6 and 7, or in any other embodiment. The electrically conductive gasket 901 may be held in place by glue, or by locking it into a groove, or the like, or by any other manner that ensures both holding in place and making an electric coupling. Other alternatives for making the desired electric coupling may involve at least one of soldering, welding, or gluing with electrically conductive glue.

Figure 10:
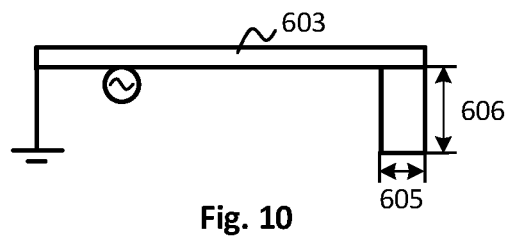
FIG. 10 illustrates the dimensioning of an antenna extender.
Figure 11:
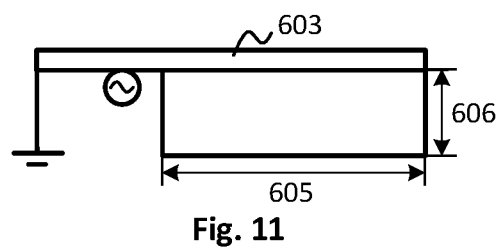
FIG. 11 illustrates the dimensioning of another antenna extender.

FIGS. 10 and 11 illustrate the concept of the dimensions of the conductive member. In FIGS. 10 and 11, the portion 603 of the conductive peripheral structure that is used as the radiating antenna element is shown schematically as a horizontal bar. FIGS. 10 and 11 illustrate embodiments in which there is a ground connection at one end of the portion 603, but there are also embodiments in which there is no such ground connection. The first dimension 605 of the conductive member is its dimension along a longitudinal direction of the portion 603. The conductive member extends inwards (with reference to the peripheral structure) from the portion by a second dimension 606. In FIG. 10 the second dimension 606 is about twice the first dimension 605, while in FIG. 11 the first dimension 605 is significantly larger than the second dimension 606. If there is a ground connection like in FIGS. 10 and 11, it may be advantageous to place the conductive member so that its distance from the ground connection in the longitudinal direction of the portion of the conductive peripheral structure is the largest possible.

Figure 12:
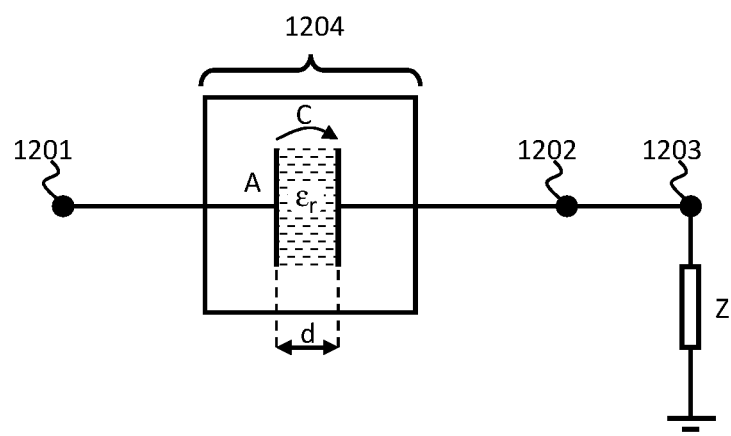
FIG. 12 illustrates an equivalent circuit of an antenna extender.

FIG. 12 illustrates an equivalent circuit in which point 1201 represents the radiating antenna element and point 1202 represents a conductive member of the kind described above. Point 1203 represents the "open" end of the conductive member, i.e. that part that is furthest away from the radiating antenna element. The so-called open-end impedance Z between point 1203 and the local ground potential is typically large, in the order of at least 100 ohms, or even at least 1 kilo-ohm.

The electric coupling between the radiating antenna element and the conductive member is represented by a contact member 1204 in FIG. 12. In general, the electric coupling may be considered to take place over an area A across a distance d through a material, the dielectric constant (or relative permittivity) of which is $\varepsilon_r$ (epsilon-subscript-r). If the electric coupling is a direct galvanic coupling through for example a direct metal-to-metal contact, the value of $\varepsilon_r$ is very large or infinite.

Figure 13:
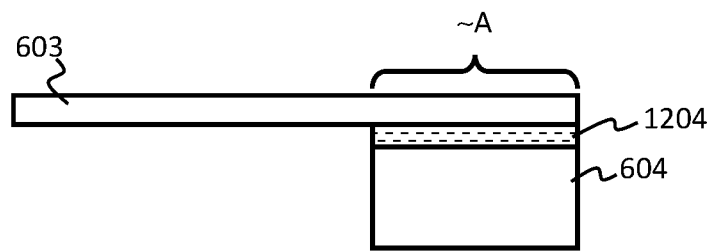
FIG. 13 illustrates an antenna extender with a contact member.

FIG. 13 shows how the elements of FIG. 12 may be considered in practice. The contact member 1204 is located between the portion 603 of the conductive peripheral structure used as the radiating antenna element and the conductive member, for which the reference 604 is used in FIG. 13. This is an example only and is not meant to limit the consideration to only those kinds of conductive members that are similar to the conductive member 604 of the embodiment in FIG. 6. The area A is proportional to the dimension of the conductive member 604 in the longitudinal direction of the portion 603. If there are two or more discrete contact members between the portion and the conductive member, like two or more discrete conductive gaskets distributed along the longitudinal direction of the electric connection, the area A is proportional to the distance between the two discrete contact members farthest away from each other.

If the electric coupling is a non-galvanic coupling, it may include at least one of a capacitive coupling or an inductive coupling. An exemplary calculation can be made for a capacitive coupling. For example, if the contact area A is 1.5 mm×12 mm, the distance d is 0.1 mm, and the material in between is air, the contact capacitance would be about 1.7 pF. That would correspond to a crossover frequency of about 90 MHz, assuming that the open end impedance is 1 kΩ. This means that a sufficient electromagnetic coupling between the radiating antenna element and the conductive member is achieved at frequencies higher than 90 MHz. In general, a crossover frequency of a non-galvanic coupling of the kind may be in the order of tens to hundreds of megahertz.

Figure 14:
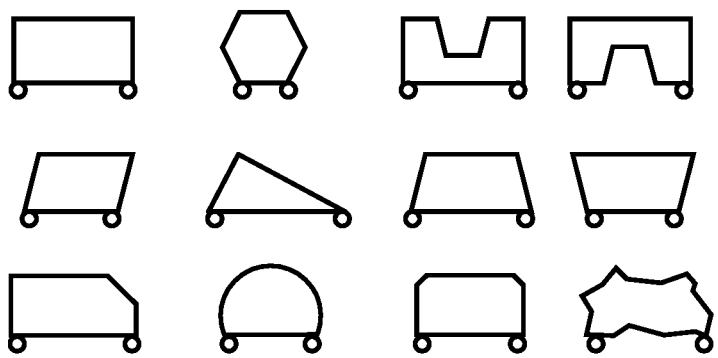
FIG. 14 illustrates examples of shapes of antenna extenders.

In the embodiments described so far, the antenna extender or conductive member has a rectangular shape. This is not a requirement, but the conductive member may take a wide variety of shapes. FIG. 14 illustrates some examples of such shapes, which include various rectangles, polygons with less or more corners than four, diamond shapes, trapezoidal shapes, shapes obtained by cutting a portion out of some otherwise regular shapes, partly round or curved shapes, and irregular shapes. The shape may be selected for example based on the shape of an available space for the antenna extender in the electronic device. The small white circles in the shapes of FIG. 14 may be considered as examples of discrete contact members, or they may be examples of weld-, solder-, or glue joints between the conductive member and the portion of the conductive peripheral structure that is used as a radiating antenna element.

Figure 15:
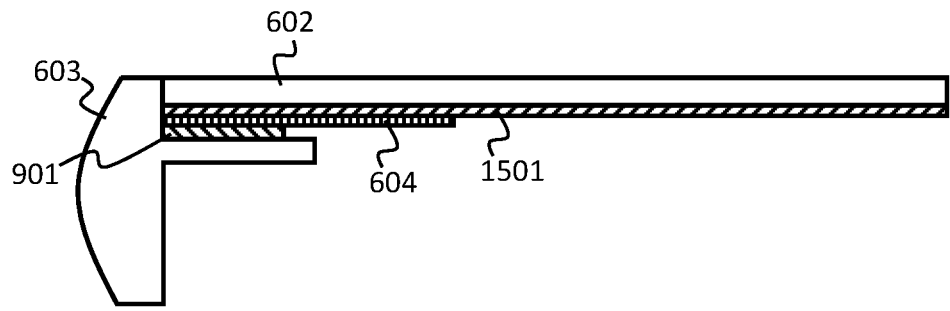
FIG. 15 illustrates some structural parts of an electronic device with an antenna extender.

FIG. 15 illustrates an embodiment in which a dielectric cover 602 on a second side of an electronic device includes a dielectric plate that is transparent or translucent and includes a decorative layer 1501 on its inner surface. The conductive member 604 is indirectly attached to the dielectric plate through being attached to the decorative layer 1501. A conductive gasket 901 ensures the electric coupling between the conductive member 604 and the portion 603 of the conductive peripheral structure that is used as a radiating antenna element.

Yet another possible embodiment could involve a conductive member made as a transparent electrically conductive layer on an outer surface of a dielectric plate that constitutes (a part of) a dielectric cover on the second side of the electronic device.

Figure 16:
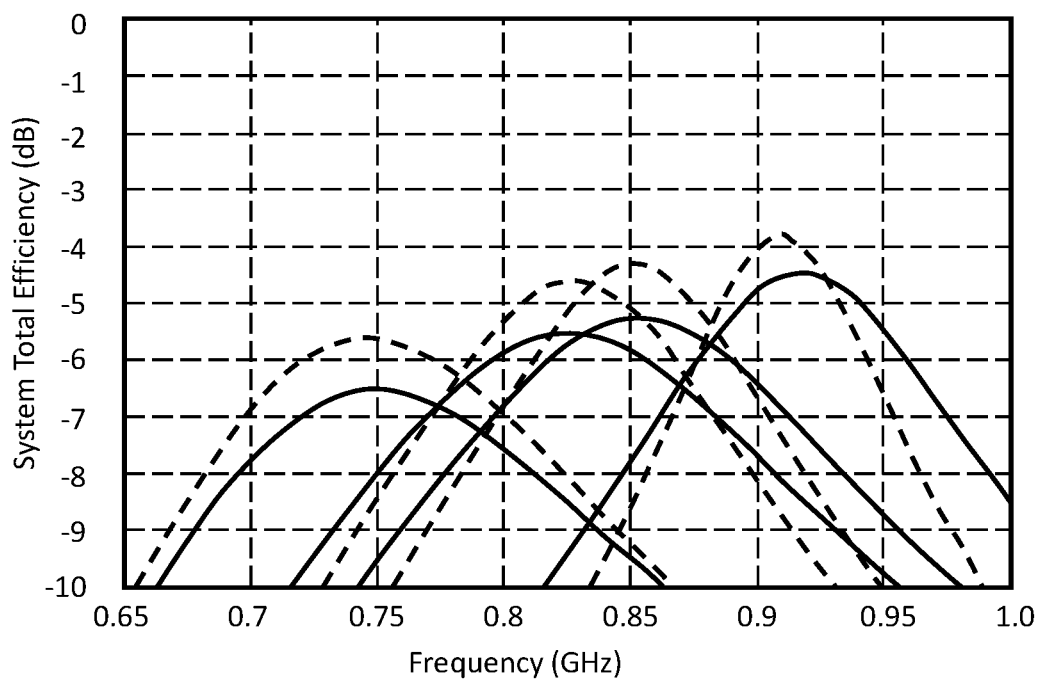
FIG. 16 illustrates measured performance of antennas with and without antenna extenders.

FIG. 16 illustrates measured total efficiencies of systems in which an electronic device includes an antenna, the radiating antenna element of which is a portion of the conductive peripheral structure along sides of the electronic device. In each case the solid line illustrates the measured total efficiency when no antenna extender of the kind described was used. The corresponding dashed line illustrates the measured total efficiency when an antenna extender of the kind described was used. The general improvement in the system's peak total efficiency was in the order of 1 dB, when the antenna extender was used. This is a result of the so-called chassis mode excitation improving and the antenna resonant frequency being optimized for the desired frequency band. In these measurements a rectangular antenna extender was used, and the dimensioning of the antenna extender was such that its dimension in the longitudinal direction of the radiating antenna element was about twice its dimension in the perpendicular direction.

The selection of the type of the radiating antenna element of the antenna structure is not limited by the embodiments. As an example, the antenna structure may be one of the following: a monopole antenna, a dipole antenna, a folded dipole antenna, a capacitive coupling element antenna, an inverted-F antenna, a loop antenna, and/or a slot antenna.

Elements have been described in conjunction with various embodiments herein. However, other variations to the disclosed embodiments can be understood and effected by those of ordinary skill in the art. In the description, the indefinite article "a" or "an" does not exclude a plurality. A single processor or other unit may fulfil the functions of several items. The mere fact that certain measures are recited in mutually different embodiments does not indicate that a combination of these measured cannot be used to an advantage.

Although the embodiments and their advantages have been described in detail, it should be understood that various changes, substitutions and alterations can be made herein without departing from the spirit and scope of the embodiments.

Although elements have been described with reference to specific features and embodiments thereof, it is evident that various modifications and combinations can be made thereto without departing from the spirit and scope of the invention. The specification and drawings are, accordingly, to be regarded simply as an illustration of the invention, and are contemplated to cover any and all modifications, combinations, or equivalents that fall within the scope of the invention.

The invention claimed is:

1. An electronic device, comprising:
a housing having a first side and a second side,
a dielectric cover on the second side,
an electrically conductive peripheral structure along edges of the first side and the second side;
an antenna feed coupled to a portion of the electrically conductive peripheral structure that is configured to use the portion of the electrically conductive peripheral structure as a radiating antenna element, wherein the portion has a first end and a second end along a longitudinal direction of the portion and the first end of the portion is an open end;
a conductive member on or underneath the dielectric cover, wherein the conductive member has a first dimension along the longitudinal direction of the portion and extends inwards from the portion, with reference to the electrically conductive peripheral structure, by a second dimension that is less than twice the first dimension, the conductive member and the antenna feed are disposed with an interval along the longitudinal direction of the portion, the antenna feed and the second end of the portion are disposed on the same side of the conductive member; and
an electric coupling between the portion of the electrically conductive peripheral structure and a part of the conductive member extends along the longitudinal direction of the portion of the electrically conductive peripheral structure.

2. The electronic device according to claim 1, wherein said second end of said portion is a grounded end.

3. The electronic device according to claim 1, wherein said first dimension is greater than said second dimension.

4. The electronic device according to claim 1, wherein said conductive member is not configured to generate any extra resonances.

5. The electronic device according to claim 1, wherein the dielectric cover is a dielectric plate, and the conductive member is mechanically supported by the dielectric plate.

6. The electronic device according to claim 5, wherein the dielectric plate is made of plastic, glass or ceramic.

7. The electronic device according to claim 6, wherein the dielectric plate has an inner surface and an outer surface, and the conductive member is a piece of conductive material fixedly attached to the inner surface of the dielectric plate.

8. The electronic device according to claim 6, wherein the dielectric plate is transparent or translucent and comprises a decorative layer on the inner surface, and the conductive member is indirectly attached to the dielectric plate by being attached to the decorative layer.

9. The electronic device according to claim 8, wherein the electric coupling is a galvanic coupling comprising:
a direct contact between the portion and the conductive member;
a coupling through a conductive gasket between the portion of the electrically conductive peripheral structure and the conductive member;
a coupling through two or more discrete contact members between the portion is a grounded end of the electrically conductive peripheral structure and the conductive member, and
a weld joint, a solder joint, or a glue joint between the portion of the electrically conductive peripheral structure and the conductive member.

10. The electronic device according to claim 8, wherein the electric coupling is a non-galvanic coupling comprising at least one of a capacitive coupling and an inductive coupling.

11. The electronic device according to claim 10, wherein a crossover frequency of the non-galvanic coupling is in the order of tens to hundreds of megahertz.

12. The electronic device according to claim 11, wherein the portion of the electrically conductive peripheral structure includes a radiating antenna element of an antenna structure that is one of the following: a monopole, a dipole antenna, a folded dipole antenna, a capacitive coupling element antenna, an inverted-F antenna, a loop antenna, and a slot antenna.

13. The electronic device according to claim 1, wherein the electronic device comprises a dielectric support structure underneath the dielectric cover and the conductive member is mechanically supported by the dielectric support structure.

14. The electronic device according to claim 13, wherein the electric coupling is a galvanic coupling comprising at least one of:
- a direct contact between the portion of the electrically conductive peripheral structure and the conductive member;
- a coupling through a conductive gasket between the portion of the electrically conductive peripheral structure and the conductive member;
- a coupling through two or more discrete contact members between the portion of the electrically conductive peripheral structure and the conductive member, and
- a weld joint, a solder joint, or a glue joint between the portion of the electrically conductive peripheral structure and the conductive member.

15. The electronic device according to claim 14, wherein the portion of the electrically conductive peripheral structure includes a radiating antenna element of an antenna structure that is one of the following: a monopole, a dipole antenna, a folded dipole antenna, a capacitive coupling element antenna, an inverted-F antenna, a loop antenna, and a slot antenna.

16. The electronic device according to claim 13, wherein the electric coupling is a non-galvanic coupling comprising at least one of a capacitive coupling and an inductive coupling.

17. The electronic device according to claim 16, wherein the portion of the electrically conductive peripheral structure includes a radiating antenna element of an antenna structure that is one of the following: a monopole, a dipole antenna, a folded dipole antenna, a capacitive coupling element antenna, an inverted-F antenna, a loop antenna, and a slot antenna.

\* \* \* \* \*